United States Patent [19]

Soles et al.

[11] Patent Number: 5,622,394
[45] Date of Patent: Apr. 22, 1997

[54] CORROSION-RESISTANT JOINT

[75] Inventors: Dennis C. Soles, Rochester Hills; Raymond R. Brauckmiller, Mount Clemens, both of Mich.

[73] Assignee: Bundy Corporation, Warren, Mich.

[21] Appl. No.: 404,517

[22] Filed: Mar. 15, 1995

[51] Int. Cl.⁶ .............................. F16L 33/20; F16L 33/24
[52] U.S. Cl. .................... 285/256; 285/149; 285/259; 285/55
[58] Field of Search .................... 285/53, 55, 256, 285/259, 149

[56] References Cited

U.S. PATENT DOCUMENTS

| | | |
|---|---|---|
| 590,258 | 9/1897 | Dale ................................................. 285/259 |
| 2,205,347 | 6/1940 | Darling ............................................ 285/259 |
| 2,268,142 | 12/1941 | Lusner et al .................................... 285/259 |
| 2,374,224 | 4/1945 | Melsom ........................................... 285/256 |
| 2,374,225 | 5/1945 | Melsom . |
| 2,384,635 | 9/1945 | Melsom ........................................... 285/256 |
| 2,685,458 | 8/1954 | Shaw ................................................ 285/259 |
| 3,462,177 | 8/1969 | Skinner et al. ................................. 285/149 |
| 3,484,121 | 12/1969 | Quinton . |
| 3,501,171 | 3/1970 | Baron ............................................... 285/52 |
| 3,549,180 | 12/1970 | MacWilliam . |
| 3,565,116 | 2/1971 | Gabin . |
| 3,711,131 | 1/1973 | Evans ............................................... 285/256 |
| 3,784,236 | 1/1974 | Slocum . |
| 3,924,883 | 12/1975 | Frank ............................................... 285/256 |
| 4,208,067 | 6/1980 | Ragout et al. . |
| 4,279,435 | 7/1981 | Alewitz . |
| 4,486,034 | 12/1984 | Sauer . |
| 4,537,183 | 8/1985 | Fogarty . |
| 4,602,808 | 7/1986 | Herron et al. . |
| 4,635,972 | 1/1987 | Lyall ................................................. 285/256 |
| 4,664,424 | 5/1987 | Smith . |
| 4,674,719 | 6/1987 | Tanioka et al. . |
| 4,775,171 | 10/1988 | Marshall . |
| 4,804,212 | 2/1989 | Vyse . |
| 4,929,002 | 5/1990 | Sauer . |
| 4,929,236 | 5/1990 | Sampson . |
| 4,932,689 | 6/1990 | Bradley . |
| 4,991,876 | 2/1991 | Mulvey . |
| 5,037,142 | 8/1991 | Helping . |
| 5,044,671 | 9/1991 | Chisnell et al. ................................. 285/256 |
| 5,090,745 | 2/1992 | Kluger . |
| 5,255,944 | 10/1993 | Blin et al. ........................................ 285/256 |
| 5,275,448 | 1/1994 | McNaughton . |

*Primary Examiner*—Eric K. Nicholson
*Attorney, Agent, or Firm*—Dorn, McEachran, Jambor & Keating

[57] ABSTRACT

A corrosion-resistant joint for use in automotive fluid line systems includes a flexible hose having an interior plastic lining surrounded by a metal wire braiding, a metal tube inserted in the hose, and a crimped metal ferrule retaining the hose on the tube. The metal tube has a plastic coated portion and an uncoated tube stem portion. The flexible hose has a plastic coated portion and an uncoated confronting end portion. The uncoated tube stem portion is received in the uncoated hose confronting end portion. The metal ferrule has a tube seal crimp portion crimped around a coated portion of the tube, a retention crimp portion crimped around the uncoated tube stem portion and uncoated hose confronting end portion, and a hose seal crimp portion crimped around the coated body portion of the hose.

20 Claims, 1 Drawing Sheet

CORROSION-RESISTANT JOINT

BACKGROUND OF THE INVENTION

This invention relates in general to fluid line systems, and more particularly to a corrosion-resistant crimped joint between rigid metal tubing and flexible braided hose.

In automotive fluid systems, rigid tubing and flexible hose are interconnected to establish fluid pathways between remote system components. The hose is typically made of rubber or plastic, while the tubing is made of metal. To add strength to the hose, while maintaining its flexibility, the hose may be encased in a wire shell braided to a tubular form. Confronting ends of tubing and hose are typically coupled by means of a metal ferrule crimped at the joint of the hose/tubing interface.

FIGS. 1 and 2 depict a prior art coupling 10 between confronting ends of a rigid metal tube 12 and a flexible hose 14. Hose 14 has an inner layer 16 of a plastic material, such as teflon, and an outer layer 18 of a metal wire braid. Hose 14 is secured to tube 12 by means of a metal ferrule 20 crimped over hose 14 and tube 12 between a stop bump 22 and a containment bump 24 formed on tube 12. As can be seen in FIGS. 1 and 2, there is metal-to-metal contact between ferrule 20 and wire braid 18, and between ferrule 20 and tube 12 (at stop bump 22).

The metal-to-metal nature of the contact between ferrule 20 and the exteriors of tube 12 and hose 14 is desirable in that it creates a strong retention force between the ferrule, tube and hose. It is also problematic, however, in that it leads to formation of corrosion, particularly at the open ends of the ferrule 20 where exposure to the operating environment is greatest. Corrosion is a significant concern in automotive systems, as the operating environment routinely involves exposure to such elements as dirt, grime, moisture, fluids, salt, etc. Depending on the particular metallic materials utilized in coupling 10, galvanic reactions may also contribute to corrosion at the sites of metal-to-metal contact.

The present invention endeavors to reduce corrosion influx at crimp joints between rigid tubing and metal-braided flexible hose.

SUMMARY OF THE INVENTION

The present invention provides improved corrosion resistance at a crimp joint between a metal tube and metal-braided hose by eliminating metal-to-metal contact at environmentally exposed areas, thereby reducing the likelihood of corrosion caused by galvanic reactions, and by providing an effective seal through plastic-to-metal contact at exposed areas, thereby reducing the likelihood of corrosion caused by environmental contaminants.

Accordingly the joint of the present invention includes a flexible hose having an interior plastic lining surrounded by a metal wire braiding, a metal tube inserted in the hose, and a crimped metal ferrule retaining the hose on the tube. The metal tube has a plastic coated portion and an uncoated tube stem portion. The flexible hose has a plastic coated portion and an uncoated confronting end portion. The uncoated tube stem portion is received in the uncoated hose confronting end portion. The metal ferrule has a tube seal crimp portion crimped around a coated portion of the tube, a retention crimp portion crimped around the uncoated tube stem portion and uncoated hose confronting end portion, and a hose seal crimp portion crimped around the coated body portion of the hose.

DETAILED DESCRIPTION OF A PREFERRED EMBODIMENT

Figure 3:
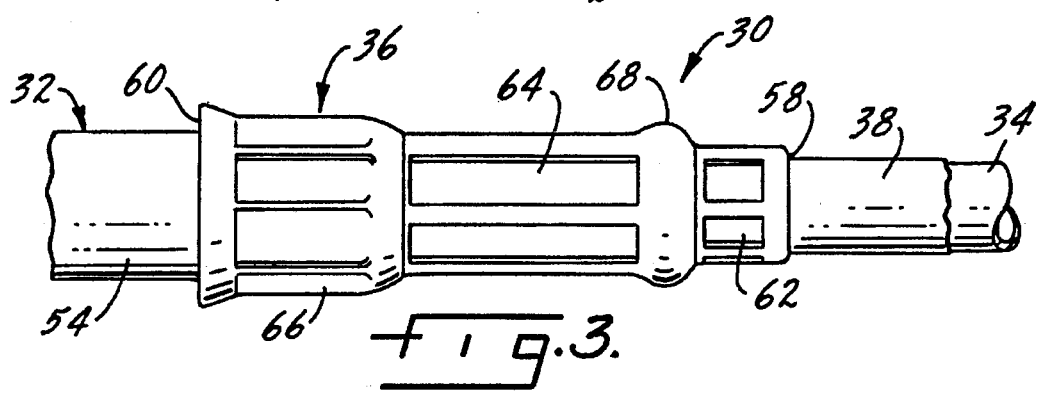
FIG. 3 is a side view of a crimp Joint according to the present invention.
Figure 4:
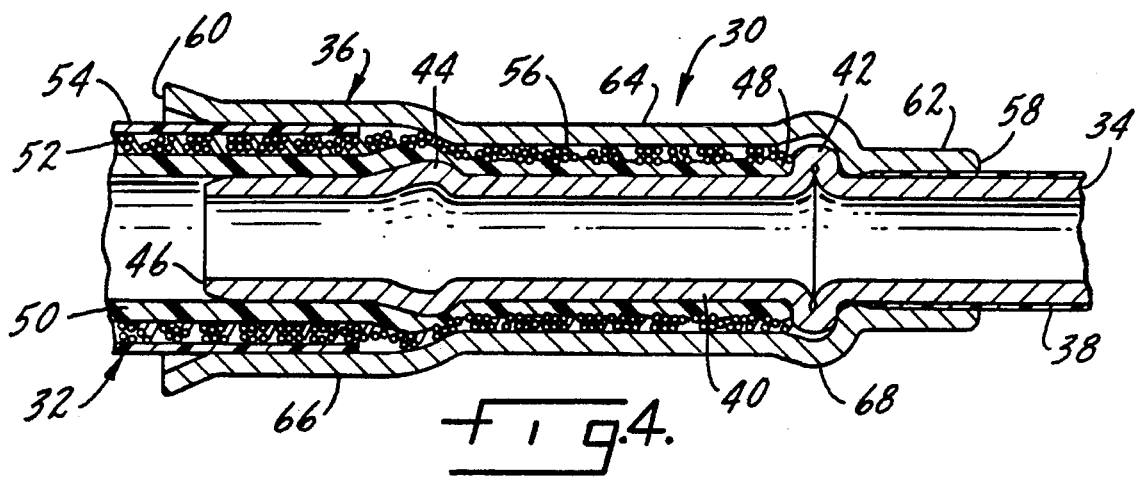
FIG. 4 is a sectional view on an enlarged scale of the crimp joint of FIG. 3.

A crimp joint formed in a fluid line system is designated as 30 in FIGS. 3 and 4. Crimp joint 30 is comprised of a flexible hose 32 secured to a rigid metal tube 34 by a crimped metal ferrule 36. Hose 32 and tube 34 lead to remote (not shown) components in the fluid line system. The remote end of tube 34 may be fastened to its mating component by a conventional, fixed-point method. The remote end of hose 32 may be fastened to its mating component through use of a similarly crimped ferrule, or through some other type of conventional restraint.

A thin layer or coating 38 of thermoplastic material (nylon preferred) is extruded over tube 34. A predetermined length of the plastic coating is then removed or stripped from one end of tube 34 to define an uncoated or stem portion 40 of tube 34. The remote (not shown) end of tube 34 is then cut to a predetermined finished length.

Stem portion 40 is specially formed to receive hose 32 with a configuration of beads or bumps. Stop bump 42 is formed adjacent to coated portion 38 of tube 34, and containment bump 44 is formed between stop bump 42 and end 46 of stem portion 40. After formation of bumps 42 and 44, end 46 is chamfered and stem portion 40 is deburred (if necessary).

Hose 32 is received over stem portion 40 of tube 34, with a confronting end 48 abutting stop bump 42. Hose 32 has an interior plastic lining 50 (preferably teflon) surrounded by an exterior metal wire braiding 52. A thin layer or coating 54 of thermoplastic or thermoset material (i.e. polyester elastomer, nylon-based or silicone-based) is extruded over metal braiding 52. The hose is cut to a predetermined length, and a portion of plastic coating 54 is removed or stripped from hose 32 to define an uncoated portion 56.

Ferrule 36 is hollow and extends between a small diameter end 58 and a large diameter end 60. End 60 is flared outward slightly. Three crimp portions are defined between ferrule ends 58 and 60. In order of increasing diameter (from small diameter end 58 towards large diameter end 60) they are: tube seal crimp portion 62, retention crimp portion 64, and hose seal crimp portion 66. An enlarged stop bump receptacle 68 is formed between crimp portions 62 and 64.

Ferrule 36 is installed over the hose/tube interface such that tube seal crimp portion 62 surrounds plastic coated portion 38 of tube 34, stop bump receptacle 68 receives stop bump 42, retention crimp portion 64 surrounds uncoated portion 56 of hose 32 and uncoated portion 40 of tube 34 between stop bump 42 and containment bump 44, and hose seal crimp portion 66 surrounds plastic coated portion 54 of hose 32.

A crimping operation produces retention crimp portion 64, tube seal crimp portion 62, and hose seal crimp portion 66. Retention crimp portion 64 retains hose 32 on tube 34 between bumps 42 and 44. This central crimp provides direct contact between the interior of metal ferrule 36 and metal braid 52 of hose 32 which in turn provides a strong retention force between the tube and the hose.

Tube seal crimp portion 62 is located over plastic coated portion 38 of tube 34, and hose seal crimp portion 66 is located over coated portion 54 of hose 32. The application of crimp force around these end locations creates sealed, plastic-to-metal contact areas at the end portions, or ingress points, of ferrule 36. These sealed contact areas prevent influx of corrosion-creating contamination and moisture into the joint, particularly into the critical retention crimp 64. Furthermore, the plastic-to-metal contact eliminates galvanic reactions at the environmentally exposed areas.

Figure 1:
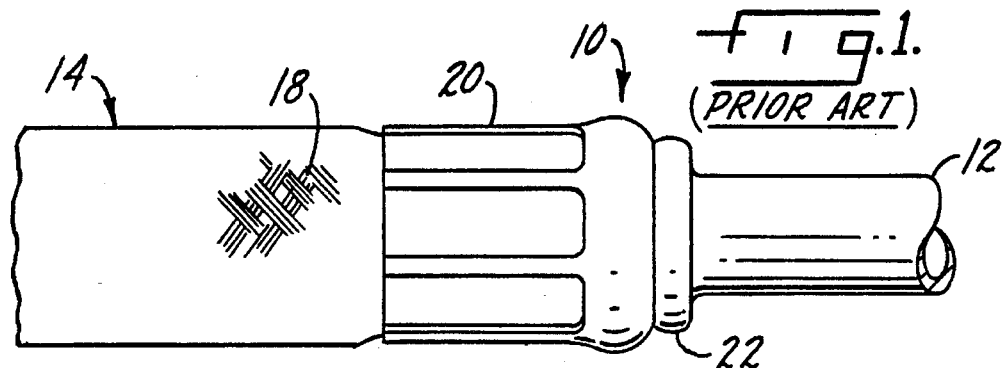
FIG. 1 is a side view of a prior art crimp joint.
Figure 2:
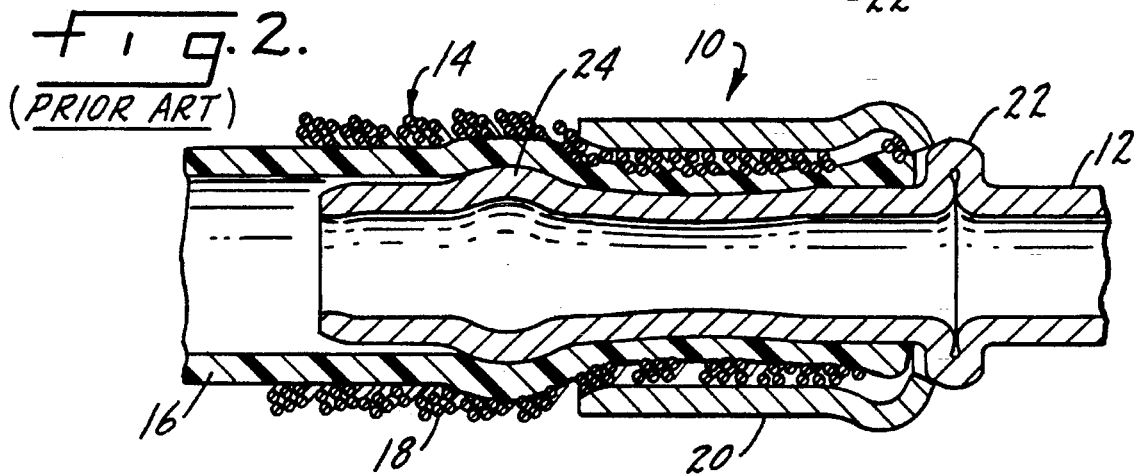
FIG. 2 is a sectional view on an enlarged scale of the crimp joint of FIG. 1.

The corrosion-resistant crimp joint 30 illustrated in FIGS. 3 and 4 represents a significant improvement over the corrosion-prone prior art joint 10 illustrated in FIGS. 1 and 2. In prior art joint 10, metal-to-metal contact occurs over the entire length of ferrule 20 with metal hose braid 14. There are no means to prevent corrosion influx into the critical crimp interface. The present invention addresses corrosion resistance by eliminating metal-to-metal contact at environmentally exposed areas and by providing an effective seal through plastic-to-metal contact at ingress points.

Various features of the present invention have been explained with reference to the embodiment shown and described. It should be understood that modification may be made without departing from the spirit and scope of the following claims.

We claim:

1. A corrosion-resistant joint comprising:
    a flexible hose having an interior plastic lining surrounded by a metal reinforcement layer, wherein a body portion of said hose is coated with a first exterior plastic layer;
    a metal tube having a body portion which is coated with a second exterior plastic layer and a stem portion which is uncoated, wherein said stem portion is partially received in a confronting end of said hose; and
    a metal ferrule crimped around said body portion of said tube at a location axially spaced from said confronting end of said hose to define a first plastic-to-metal seal, and crimped around said body portion of said hose to define a second plastic-to-metal seal.

2. A joint as claimed in claim 1, wherein a central section of said metal ferrule is crimped around an uncoated portion of said hose and said stem portion of said tube to establish a metal-to-metal retention crimp between said first and second plastic-to-metal seals.

3. A joint as claimed in claim 2 wherein one end of said ferrule has a diameter greater than a diameter of an opposite end of said ferrule, and said central section of said ferrule has a diameter intermediate said diameters of said ferrule ends.

4. A corrosion-resistant joint for use in automotive fluid line systems comprising:
    a flexible hose having an interior plastic lining surrounded by a metal reinforcement layer, wherein a body portion of said hose is coated with a first exterior plastic layer, and a confronting end portion of said hose is uncoated;
    a metal tube having a body portion which is coated with a second exterior plastic layer and a stem portion which is uncoated, wherein said stem portion is received in said confronting end portion of said hose; and
    a metal ferrule surrounding said hose and said tube and having a tube seal crimp portion crimped around said coated body portion of said tube, said tube seal crimp portion being axially spaced from said confronting end of said hose, a retention crimp portion crimped around said uncoated tube stem portion and uncoated hose confronting end portion, and a hose seal crimp portion crimped around said coated body portion of said hose.

5. A joint as claimed in claim 4, wherein said tube seal crimp portion and said hose seal crimp portion define plastic-to-metal seals which prevent introduction of corrosion-causing elements into said joint.

6. A joint as claimed in claim 5, wherein said hose seal crimp portion has a greater diameter than said retention crimp portion, and said retention crimp portion has a greater diameter than said tube seal crimp portion.

7. A joint as claimed in claim 6, wherein a free end of said hose seal crimp portion is flared outwardly.

8. A method of forming a corrosion-resistant joint in a fluid line system comprising the following steps:
    (a) extruding a thin layer of plastic over a metal tube and stripping a predetermined length of said plastic layer from one end of said tube to define an uncoated tube stem portion;
    (b) extruding a thin layer of plastic over a flexible hose having an exterior metal braided shell and stripping a predetermined length of said plastic layer from one end of said hose to define an uncoated hose confronting end portion;
    (c) inserting said uncoated tube stem portion into said hose confronting end portion; and
    (d) crimping a ferrule surrounding said hose and said tube at a first end section surrounding a coated portion of said tube, at a second end section surrounding a coated portion of said hose, and at a middle section surrounding said uncoated tube stem portion and said uncoated hose confronting end portion.

9. A joint as claimed in claim 1 wherein said reinforcement layer comprises a wire braiding.

10. A joint comprising:
    a flexible hose;
    a metal tube having a body portion which is coated with a first exterior plastic layer and a stem portion which is uncoated, wherein said stem portion is received in a confronting end of said hose; and
    a metal ferrule crimped around said hose and crimped around said body portion of said tube to define a first plastic-to-metal seal axially spaced from said confronting end of said hose.

11. A joint as claimed in claim 10 wherein said hose comprises a metal reinforcement layer, and a body portion of said hose is coated with a second exterior plastic layer.

12. A joint as claimed in claim 11 wherein said ferrule is crimped around said body portion of said hose to define a second plastic-to-metal seal.

13. A joint as claimed in claim 11 wherein said ferrule is crimped around an uncoated portion of said hose to establish a metal-to-metal retention crimp.

14. A joint as recited in claim 11 wherein said hose further comprises an interior plastic layer which terminates at a same location at said confronting end of said hose as does said reinforcement layer.

15. A joint as recited in claim 11 wherein said reinforcement layer comprises a wire braiding.

16. A joint as claimed in claim 1, wherein said second plastic layer is interposed directly between said ferrule and said tube to define said tube seal crimp portion.

17. A joint as claimed in claim 1, wherein said interior plastic lining and said reinforcement layer terminate at a same location at said confronting end of said hose.

18. A joint as claimed in claim 5, wherein said second plastic layer is interposed directly between said ferrule and said tube to define said tube seal crimp portion.

19. A joint as claimed in claim 4, wherein said interior plastic lining and said reinforcement layer terminate at a same location at said confronting end of said hose.

20. A joint as claimed in claim 10, wherein said first plastic layer is interposed directly between said ferrule and said tube to define said plastic-to-metal seal.

* * * * *